March 13, 1962  E. C. LEWIS  3,024,800
CASKS AND VALVE MEANS THEREFOR
Filed July 24, 1959  3 Sheets-Sheet 1

FIG.I.

Inventor:-
Eric Crisp Lewis
Watson, Cole, Grindle & Watson
Attorneys

March 13, 1962 E. C. LEWIS 3,024,800
CASKS AND VALVE MEANS THEREFOR
Filed July 24, 1959 3 Sheets-Sheet 2

Inventor:-
Eric Crisp Lewis

Watson, Cole, Grindle & Watson
Attorneys

March 13, 1962 E. C. LEWIS 3,024,800
CASKS AND VALVE MEANS THEREFOR
Filed July 24, 1959 3 Sheets-Sheet 3

Inventor:-
Eric Crisp Lewis
Watson, Cole, Grindle & Watson
Attorneys

United States Patent Office 3,024,800
Patented Mar. 13, 1962

3,024,800
CASKS AND VALVE MEANS THEREFOR
Eric Crisp Lewis, London, England, assignor of one-half to Alumasc Limited, London, England, a British company
Filed July 24, 1959, Ser. No. 829,289
Claims priority, application Great Britain Aug. 8, 1958
1 Claim. (Cl. 137—209)

This invention relates to casks for containing beer or like beverages and is concerned with that kind of cask that has a compartment for containing beer or the like and another compartment for containing gas under pressure for use in carbonating or aerating the beer or the like and/or for acting on the surface of the latter in dispensing the beer or the like from the cask.

The object of the present invention is to provide an improved construction and arrangement of cask adapted for use in combination with valve means therefore whilst a particular object of the invention is to provide such a combination of cask and valve means that is capable of being readily transported and handled and which is simple to use in the dispensing of beer or like beverages from the cask. Other advantages will be apparent from the following description.

For simplicity the compartment for containing beer or the like, the compartment for containing gas and the compartment for receiving valve means are respectively referred to hereafter as the beer compartment, gas compartment and valve compartment whilst the expression "beer" is used for brevity and except where specifically mentioned includes within its scope various alcoholic and non-alcoholic beverages including fruit juices and wines.

Figure 1:
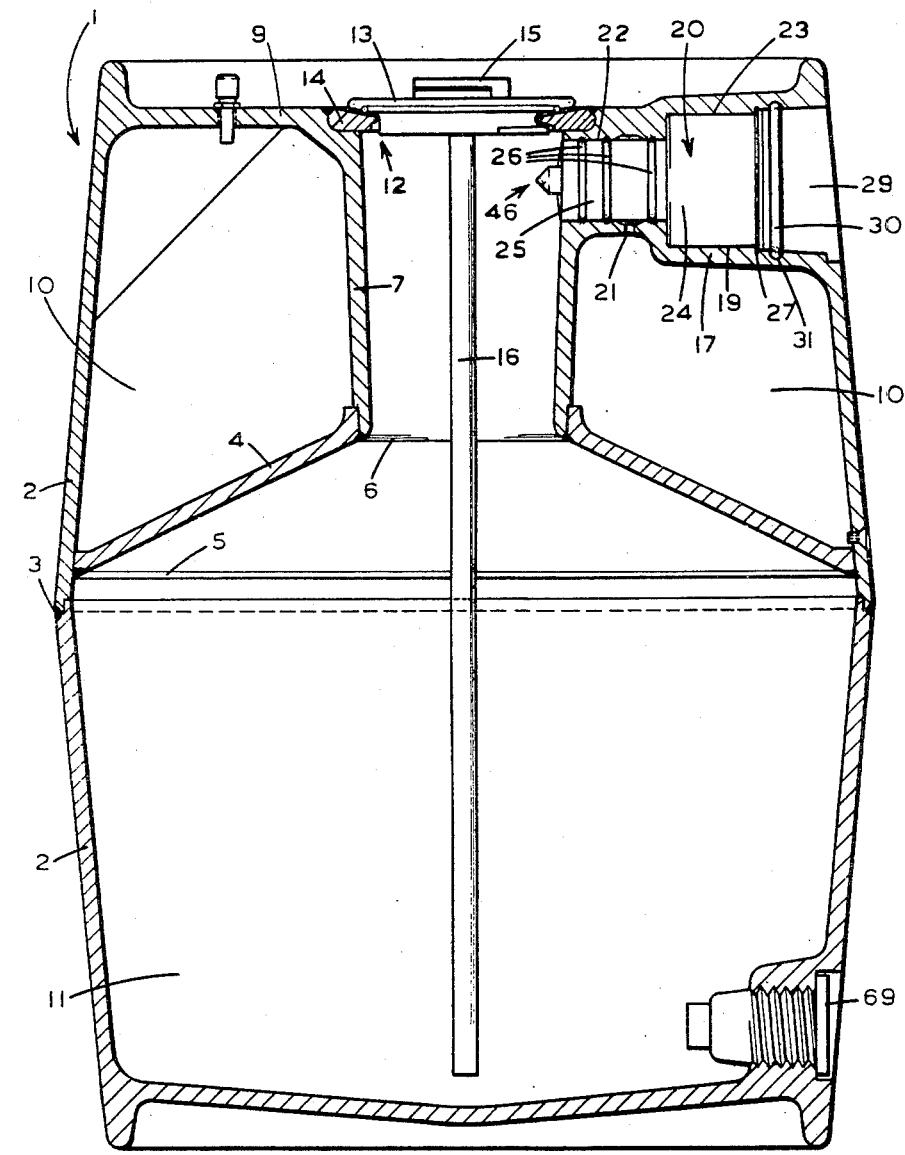
FIGURE 1 is a view in axial plane section of a cask according to this invention.
Figure 2:
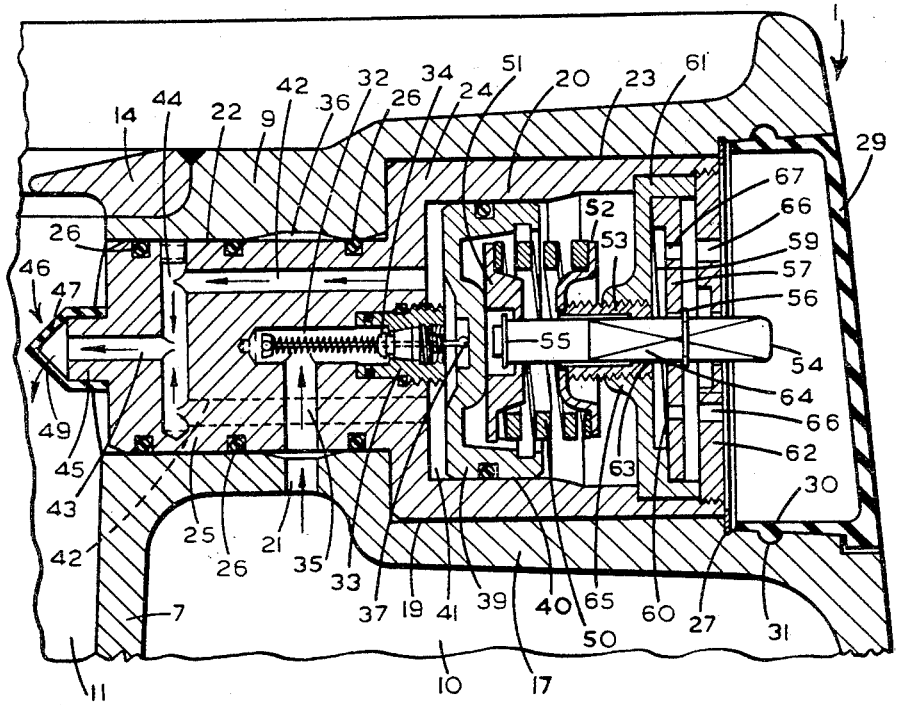
FIGURE 2 is a view on an enlarged scale and in axial plane section of a fluid pressure reducing valve in position in the cask.

Referring to FIGURES 1 and 2 of the drawings a metal barrel or cask 1 (FIGURE 1) should be employed such as cast aluminum mask as shown. The cask 1 may be produced from two cast halves 2, 2 each including an end wall and having a spigotted connection at the largest diameter 3 where they are welded together.

The cask is provided with an internal partition 4 peripherally welded therein at 5 and having a central opening 6 secured in a fluid tight manner as by welding to a tubular part of funnel 7 extending from the normally upper end wall 9 of the cask when the latter is employed in the standing position shown. If desired the partition 4 may be integral with the funnel 7.

The partition 4 and tubular part 7 together with the adjacent parts of the cask 1 thus define an annular gas compartment 10, the interior of the tubular part 7 and the remainder of the cask interior on the other side of the partition 4 constituting the beer compartment 11 which thus extends from end to end of the cask.

The opening 12 at the upper or outer end of the tubular part 7 in the upper end wall 9 is shown closed by an end cover 13 having a releasable fluid tight engagement (e.g. of the projection and gap type) with a seating ring 14 at said opening 12, the cover 13 having a connector 15 for drawing off beer from the cask by means of the pipe 16, which connector 15 may embody non-return valve means.

In order to effect regulated passage of gas from the gas compartment 10 to the beer compartment 11 and in accordance with this invention there is provided a further compartment 19 receiving or adapted to receive valve means 20 which is preferably a fluid pressure reducing valve.

The compartment 19 and housing 17 therefor for the valve 20 is shown radially disposed in the cask 1 for communicating at its inner end with the interior of the tubular part 7 and at its side via a port 21 (or a plurality thereof) with the gas compartment 10. The valve compartment 19 is shown consisting of a bore 22 and counter bore 23 receiving a valve body 24 of complementary form of which the reduced portion 25 has a fluid tight fit in the bore 22 of the valve compartment 19 by means of sealing rings 26 whilst the valve body 24 is retained in the counterbore 23 by means of a circlip 27 and closed to the exterior by a plug 29 which may be of rubber or plastic material having a removable push fit in the outer end of the counterbore 23, the peripheral rib 30 on the plug 29 snapping into the groove 31 in the counterbore 23.

Referring to FIGURE 2 the reduced portion 25 of the valve body 24 has an axial bore 32 carrying by means of a mounting bush 33 a non-return valve 34 of the Schrader inflation type, a radial bore 35 communicating said axial bore 32 with the port (or ports) 21 to the gas compartment 10 or with an annular groove 36 in the bore 22 communicating with said port (or ports) 21.

The needle head 37 of the Schrader valve 34 is acted upon by a piston 39 slidable in a bore 40 in the larger part of the valve body 24, said bore 40 together with the piston 39 on the valve side thereof defining a chamber 41 which communicates with a least one eccentric bore 42 preferably two thereof as shown in the reduced portion 25 of the valve body 24 with an axial bore 43 at the extreme inner end of the reduced portion 25 via a transverse bore 44. The said axial bore communicates with the interior of the tubular part 7 and hence the beer compartment 11 so that the chamber 41 is in constant communication with the latter.

In order to prevent or minimize beer reaching the bores 42, 43 and 44 and chamber 41 a further reduced extremity 45 of the valve body 24 and containing some of the bore 43 is provided with a non-return valve 46 in the form of a rubber cap 47 having a slit 49 therein which allows passage of gas into the beer compartment 11 but prevents or minimises passage of beer or the like in the opposite direction into the valve 20.

The piston 39 is spring loaded by a compression spring 50 shown abutting a washer 51 hereafter referred to against the back of the piston 39 and taking abutment at its other end against a seating washer 52 adjustable axially such as by screw means for varying the spring loading on the piston 39 according to the gas pressure required in the beer compartment 11. The said seating washer 52 may be simply adjusted by an axial screw threaded in the valve body 24 so as to abut the washer 52 but in the example shown it is adjusted by means of the threaded sleeve 53 and axial pin 54 described hereafter.

From the foregoing it will be appreciated that the valve 20 maintains a constant reduced pressure in the beer compartment 11 despite reduction of the quantity of beer in the latter as it is drawn off, since, on gas pressure tending to fall in the beer compartment 11 the piston 39 is moved against the Schrader valve pin head 37 to lift the valve member 34 of the latter and allow gas to pass from the gas compartment 10 via the port 21 and bores 35, 32 into the chamber 41 and from thence via the bores 42, 44, 43 and valve 46 into the beer compartment 11 until the required gas pressure is restored in the beer compartment 11.

In order to render the valve 20 inoperative such as when the charged cask is in transit or being handled, means are provided for relieving the piston 39 of spring pressure.

For this purpose and in the example shown the pin 54 engages the washer 51 at one end by means of a circlip 55 and at the other or outer end engages by a further circlip 56 the outer face of the disc 57 formed on its inner side with a face cam 59 adjacent its periphery. This face cam 59 co-operates with a further face cam 60 of complementary form on a further disc-like member 61 that is made fast in the valve body 24 as by means of an end cover 62 threaded in said valve body 24.

Threaded in an axial boss 65 to the disc-like member 61 is the sleeve 53 which abuts or carries the seating washer 52 for the spring 50. The inner bore of the sleeve has a portion 63 of square or non-circular form that cooperates with a portion 64 of square section or complementary non-circular section of the pin 54, the arrangement being that on the pin 54 itself being turned the sleeve 53 is also turned and by virtue of its threaded engagement with the boss 65 of the disc-like member 61 advances or retracts axially for the purpose of varying the spring loading on the piston 39 by thus adjusting the seating washer 52.

When it is desired to render the valve 20 inoperative by relieving the piston 39 of spring pressure the disc 57 is rotated by a suitable key (not shown) having a pair of prongs which engage holes 67 in said disc and due to the co-action of the cam faces 59, 60 the disc 57 is moved axially and also the pin 54 with it which now slides through the sleeve 53 without turning the latter. On outward movement of the disc 57 and pin 54 the washer 51 is also moved with the latter lifting the spring 50 away from the piston 39.

In order to gain access to the disc 57 for turning it, without removal of the end cover 62 the latter is provided with slots 66 curved in a concentric manner relative to the axis of the valve so as to permit sufficient angular movement of the key prongs in turning the disc 57.

By such operation of the disc 57 the valve 20 is thus rendered inoperative but can be readily returned to the operative condition by reversed rotation of the disc 57, operation of which does not affect the setting of the valve 20 when fully restored to the operative condition as determined by the position of the seating washer 52 and sleeve 53.

Figure 3:
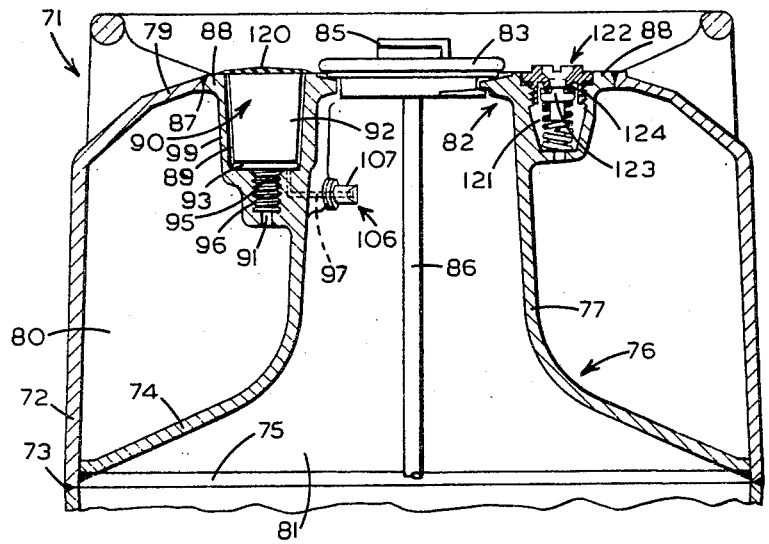
FIGURE 3 is a view similar to FIGURE 1 of a modification.
Figure 4:
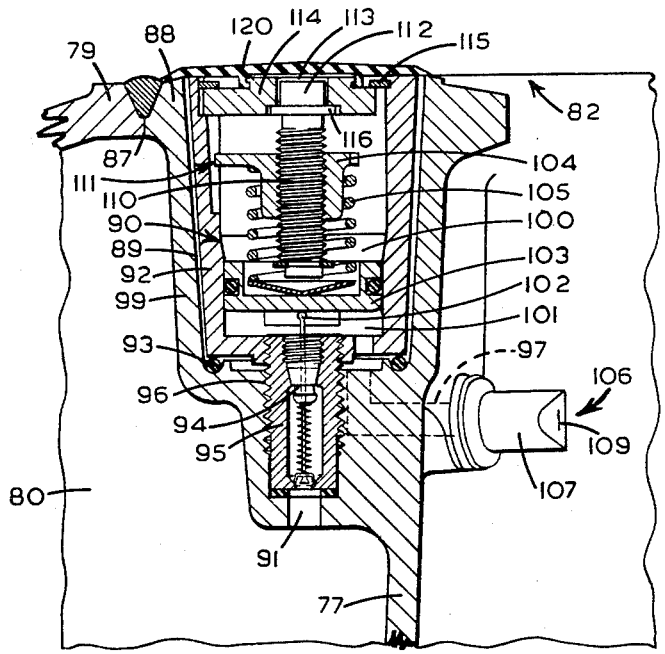
FIGURE 4 is an enlarged sectional detail view of the reducing valve employed in FIGURE 3.

Referring to FIGURES 3 and 4 the interior of the cask 71 is partitioned into gas and beer compartments 80/81 by a partition member or unit 76 which is shown consisting of a tubular or funnel portion 77 which is outwardly directed or flared at one end at 74. The said partition unit 76 may be produced as an aluminium casting and is secured in a fluid tight manner such as by welding in one half of the cask e.g. prior to securing the two halves 72 of the latter together.

The periphery of the flared portion 74 is welded at 75 to the inner wall of its cask half 72 near the largest diameter 73 of the latter whilst the other end of the funnel portion 77 is welded in an opening 87 in the end wall 79 of the cask half 72 and is shown provided with an integral head 88 for this purpose.

As before the outer end of the funnel 77 in the head 88 of the partition unit 76 may be provided with an opening 82 that is closed by an end cover 83 having a connector 85 and a pipe 86 and preferably having a releasable fluid tight engagement (e.g of the projection and gap type) with said head 88 or a seating ring therein about said opening 82.

The partition unit 76, or more particularly the funnel portion 77 and head 88 thereof, carries or integrally embodies a housing 99 containing a compartment 89 for receiving reducing valve means 90, said valve compartment 89 communicating the gas compartment 80 via such valve means 90 with the beer compartment 81.

The valve compartment 89 is shown of generally cylindrical form to receive the body 92 of the valve means 90 and has its axis substantially parallel but eccentric to the axis of the cask 71 whilst its outer end is disposed at the partition unit head 88 for access to the valve means 90 in adjusting the latter or removing it from the valve compartment 89. If desired and as shown the valve compartment 89 and valve body 92 may be of complementary taper form with the valve body 92 seating on fluid tight sealing means 93 within the valve compartment 89.

The partition unit 76 may also carry or embody, again mainly in association with the head 88 and funnel 77 thereof, provision such as a suitable bore 121 for receiving a gas filling valve 122 for the purposes of charging the gas compartment 80 with a suitable gas under pressure.

Such bore 121 is preferably remotely situated in the head 88 in relation to the valve compartment 89 and as shown may be diametrically opposite the latter on the other side of the funnel 77. The gas filling valve 122 may consist of a spring loaded valve member 123 which is pressed away from an internal seating 124 on the application of a gas supply connector member.

The reducing valve means 90 preferably consists of a non-return valve 94 of the Schrader inflation type mounted by means of a tubular part or bush 95 therefor either directly in a reduced bore 96 of the valve compartment 89 (as shown) or in a similar part of the valve body 92. In either case the Schrader valve 94 communicates substantially directly with the gas compartment 80 through a port 91 in the valve compartment 89.

A suitable duct or passageway 97 in the body of the valve compartment housing 99 is right angled or otherwise directed to communicate the interior of the reducing valve body 92 with the beer compartment 81 preferably via a non-return valve 106 which as before may simply consist of a rubber cap 107 at the end of said duct 97 and in the beer compartment 81 said cap 107 having a slit 109 which allows passage of gas into the beer compartment 81.

The interior of the reducing valve body 92 contains a chamber 101 with which both the said duct 97 and the Schrader valve 94 communicate, the usual needle head 102 of the Schrader valve 94 extending into said chamber 101 which latter is variably defined by a piston 103 having a fluidtight sliding fit in said valve body 92.

Apart from substantially atmospheric pressure the other side of the piston 103 is subject to spring loading mechanism 100 which urges it towards the needle head 102 of the Schrader valve 94 and the arrangement is such that on the needle head 102 being contacted by the piston 103 to lift the Schrader valve 94, gas passes from the gas compartment 80 via the Schrader valve 94, chamber 101 and duct 97 into the beer compartment 81. Upon the required maximum pressure being attained in the latter such pressure builds back via the duct 97 into the chamber 101 to move the piston against its spring loading means 100 away from the needle head 102 of the Schrader valve 94 allowing the latter to seat and thus close off the gas supply. In this way and as before it will be appreciated that the valve means 90 maintains a constant reduced pressure in the beer compartment 81 despite reduction of the quantity of beer in the latter as it is drawn off.

In order to adjust the spring loading of the piston 103 and also if desired to relieve it of spring pressure (e.g. during transit) an adjustable abutment member 104 for the spring 105 is provided operable by an adjusting screw 110.

The abutment member 104 may consist of a plate or disc having a threaded engagement with an axial adjusting screw 110, the plate 104 being axially movable in the valve body 92 but constrained against rotation. For this purpose the plate 104 may have a projection and groove engagement at 111 with the inner wall of the valve body 92.

In order to constrain the adjusting screw 110 against axial movement its outer end is provided with a head 112 located in a bore 113 in a cover 114 to the valve body 92, said cover 114 being removably secured on the latter such as by means of a circlip 115.

The head 112 of the screw 110 which may be of the socket type, is disposed in or through the bore 113 so that it is accessible from the exterior, the screw 110 being constrained against axial movement through the cover 114 such as by means of a flange 116 on the screw head 112 abutting the inner side of said cover 114.

The action of the compression spring 105 acting between the piston 103 and plate 104 thrusts the screw 110 against the cover 114 and thus maintains it against axial movement. Rotation of the screw 110 axially advances or retracts the plate 104 for varying the spring loading on the piston 103 and, if the plate 104 is retracted far enough, the piston 103 may be entirely relieved of spring pressure.

By removing the cover 114 the spring loading mechanism 100 is readily dismantled by simply withdrawing the screw 110, plate 104 thereon, and spring 105.

The exterior of the valve compartment 89 is preferably closed by a cap 120 e.g. of plastic material in order to enclose or seal the cover 114 and adjusting screw head 112 from the exterior.

In using a charged cask according to FIGURES 1 and 2 or 3 and 4 at a public house or like establishment the cask is either provided with a beer tap (not shown) e.g. at 69 (FIGURE 1), or connected to a counter tap and due to the constant gas pressure on the surface of the beer in the beer compartment 11 or 81 (as regulated by the reducing valve 20 or 90) beer is forced out under pressure as and when the tap is opened.

The beer or the like in the cask may have been initially carbonated prior to its introduction into the cask or the gas compartment 10 or 80 may contain carbon dioxide arranged to enter the cask beer compartment 11 or 81 at a pressure sufficient to carbonate the beer or the like therein. Where the beer has been previously carbonated the gas compartment 10 or 80 may contain air and/or carbon dioxide or any other desired gas or mixture of gases for acting upon the beer in the beer compartment 11 or 81 for forcing the latter out during dispensing.

The interior of the beer compartment 11 or 81 should be treated against any undesired action of the beer or the like by any suitable protective material or process for this purpose.

I claim:

A cask of the kind and for the purposes referred to comprising a hollow cask body having side and end walls; a tubular part extending from one end wall substantially centrally within the cask for a part of the length of the latter and having an open inner end and a normally closed other end; a partition extending outwardly from the open inner end of said tubular part to fluid tight connection with the interior of the side walling of the cask so as to define wholly within said cask and about said tubular part an annular compartment for containing gas under pressure separate from the remainder of the cask interior which latter together with the interior of the tubular part communicated therewith by said open inner end provides a compartment wholly within the cask for containing beer or other beverage; and a housing wholly within said annular compartment, said housing being directly fast with at least said tubular part and ported for separate communication with the interior of said tubular part and with said annular gas compartment whilst said housing extends to the exterior of the cask and is open thereat; and a fluid pressure reducing valve bodily and removably received by said housing in a fluid tight manner so as to be wholly contained thereby for separate communication with both the annular gas compartment and with the interior of the tubular part via the porting in said housing for controlling gas flow from said gas compartment to the said interior of the tubular part and the said remainder of the cask interior.

References Cited in the file of this patent
UNITED STATES PATENTS

| | | |
|---|---|---|
| 635,678 | Eckardt | Oct. 24, 1899 |
| 798,942 | Baroch | Sept. 5, 1905 |
| 938,517 | Schmitt | Nov. 2, 1909 |
| 1,238,271 | Crovo | Aug. 28, 1917 |
| 2,021,367 | Louis | Nov. 19, 1935 |
| 2,180,828 | Horansky | Nov. 21, 1939 |